(12) United States Patent
Bigi et al.

(10) Patent No.: US 12,246,310 B2
(45) Date of Patent: Mar. 11, 2025

(54) PROCESSES FOR RECOVERY OF RHODIUM FROM A HYDROFORMYLATION PROCESS

(71) Applicant: Dow Technology Investments LLC, Midland, MI (US)

(72) Inventors: Marinus A. Bigi, Pearland, TX (US); Michael A. Brammer, Lake Jackson, TX (US); Thomas C. Eisenschmid, Cross Lanes, WV (US); Glenn A. Miller, South Charleston, WV (US); George R. Phillips, South Charleston, WV (US); Amarnath Singh, Pearland, TX (US)

(73) Assignee: Dow Technology Investments LLC, Midland, MI (US)

( * ) Notice: Subject to any disclaimer, the term of this patent is extended or adjusted under 35 U.S.C. 154(b) by 449 days.

(21) Appl. No.: 17/754,163

(22) PCT Filed: Oct. 20, 2020

(86) PCT No.: PCT/US2020/056414
§ 371 (c)(1),
(2) Date: Mar. 25, 2022

(87) PCT Pub. No.: WO2021/091687
PCT Pub. Date: May 14, 2021

(65) Prior Publication Data
US 2022/0288574 A1 Sep. 15, 2022

Related U.S. Application Data

(60) Provisional application No. 62/930,833, filed on Nov. 5, 2019.

(51) Int. Cl.
*B01J 31/40* (2006.01)
*B01J 31/18* (2006.01)

(52) U.S. Cl.
CPC ....... *B01J 31/4092* (2013.01); *B01J 31/1845* (2013.01); *B01J 31/4046* (2013.01); *B01J 2231/321* (2013.01); *B01J 2531/822* (2013.01)

(58) Field of Classification Search
CPC ......................... B01J 31/4092; B01J 31/1845; B01J 31/4046; B01J 2231/321; B01J 2531/822
USPC ........................ 502/28, 33; 423/22
See application file for complete search history.

(56) References Cited

U.S. PATENT DOCUMENTS

| | | | |
|---|---|---|---|
| 4,021,463 A | 5/1977 | Kummer et al. | |
| 4,148,830 A | 4/1979 | Pruett et al. | |
| 4,196,096 A | 4/1980 | Dawes et al. | |
| 4,242,284 A | 12/1980 | Harris et al. | |
| 4,247,486 A | 1/1981 | Brewester et al. | |
| 4,374,278 A | 2/1983 | Bryant et al. | |
| 4,400,547 A | 8/1983 | Dawes et al. | |
| 4,528,403 A | 7/1985 | Tano et al. | |
| 4,605,780 A | 8/1986 | Billig et al. | |
| 4,710,587 A | 12/1987 | Bryant et al. | |
| 5,237,106 A * | 8/1993 | Babin ................. | B01J 31/2404 502/28 |
| 5,290,743 A | 3/1994 | Chang | |
| 5,395,979 A | 3/1995 | Deckman et al. | |
| 5,741,944 A | 4/1998 | Bryant et al. | |
| 5,936,130 A | 8/1999 | Mori et al. | |
| 9,676,805 B2 | 6/2017 | Dyballa et al. | |
| 9,751,904 B2 | 9/2017 | Dyballa et al. | |
| 10,017,443 B2 | 7/2018 | Lueken et al. | |
| 10,792,652 B2 * | 10/2020 | Brammer ............. | B01J 31/4053 |
| 11,141,719 B2 * | 10/2021 | Brammer ............. | B01J 31/186 |
| 11,229,900 B2 * | 1/2022 | Brammer ............. | B01J 31/4053 |
| 2003/0175188 A1 * | 9/2003 | Gelling ................. | B01J 38/56 423/22 |

(Continued)

FOREIGN PATENT DOCUMENTS

| | | | | |
|---|---|---|---|---|
| EP | 015379 A1 * | 9/1980 | ............. | B01J 31/40 |
| EP | 0829300 A1 * | 3/1998 | .......... | B01J 31/1845 |

(Continued)

OTHER PUBLICATIONS

"Rhodium Catalyzed Hydroformylation," van Leeuwen, Claver, Kluwer Academic Pub., 2000, p. 37-43.

(Continued)

*Primary Examiner* — Patricia L. Hailey

(57) ABSTRACT

The present invention generally relates to processes for the recovery of rhodium from a catalyst purge stream from a C6 or higher olefin hydroformylation process. In one embodiment, the process comprises (a) treating a catalyst-containing liquid purge stream from the hydroformylation process, wherein the catalyst comprises a precious metal and an organophosphorous ligand, with an oxidant in the presence of a separate liquid aqueous phase comprising a halide-free acid at a sufficient temperature to effect oxidation of a majority of the contained organophosphorous ligand, wherein the halide-free acid is a C1-C6 organic acid or phosphorous acid; (b) recovering the aqueous phase; (c) contacting the aqueous phase with a separate organic phase by mixing the two phases under a syngas atmosphere, wherein the separate organic phase comprises water-insoluble, hydrolysable organophosphorous ligand and recycled olefin from a hydroformylation process; and (d) separating the organic phase to be recycled back to a hydroformylation process.

13 Claims, No Drawings

(56) References Cited

U.S. PATENT DOCUMENTS

2013/0317246 A1   11/2013  Kreidler et al.
2020/0269226 A1    8/2020  Bigi et al.

FOREIGN PATENT DOCUMENTS

| EP | 3145940 A1 | 3/2017 | |
|---|---|---|---|
| EP | 3176174 A1 | 6/2017 | |
| JP | 2000034252 A * | 2/2000 | ............. C07C 45/50 |
| KR | 2019005328 | 1/2019 | |
| KR | 20190127277 A | 11/2019 | |
| RU | 2585285 C1 | 5/2016 | |
| WO | WO-9421377 A1 * | 9/1994 | .......... B01J 19/2475 |
| WO | 2002/020451 A1 | 3/2002 | |
| WO | 2013184350 A1 | 12/2013 | |
| WO | WO-2019094290 A1 * | 5/2019 | ............ B01J 31/185 |

OTHER PUBLICATIONS

PCT/US2020/056414, International Search Report and Written Opinion with a mailing date of Feb. 8, 2021.
PCT/US2020/056414, International Preliminary Report on Patentability with a mailing date of May 10, 2022.

* cited by examiner

PROCESSES FOR RECOVERY OF RHODIUM FROM A HYDROFORMYLATION PROCESS

CROSS-REFERENCE TO RELATED APPLICATIONS

This application is a U. S. National Phase Application of International Application No. PCT/US2020/056414, filed Oct. 20, 2020, which claims benefit to Provisional Application No. 62/930,833, filed Nov. 5, 2019, each of which are hereby incorporated by reference in their entirety.

FIELD

The present invention relates to processes for recovering rhodium from a hydroformylation process, and in particular, to processes for recovering rhodium from a hydroformylation process wherein the hydroformylation process comprises producing at least one aldehyde in a reaction zone, the reaction zone comprising a $C_6$ or higher olefin, hydrogen, and carbon monoxide in the presence of a catalyst, wherein the catalyst comprises rhodium and an organophosphorus ligand.

BACKGROUND

It is well known that continuous hydroformylation processes will slowly form relatively high-boiling aldehyde-derived byproducts over time (see, e.g., U.S. Pat. Nos. 4,148,830 and 4,247,486). Because these "heavies" (as defined further below) often serve as the reaction solvent, they are initially allowed to accumulate in liquid recycle processes, but adjustments in product separation conditions (e.g., temperature, pressure, strip gas flow rate, etc.) must be made to prevent their concentration from increasing beyond practical limits. Establishing a ratio of reactor effluent (feed) introduced to the separation zone relative to the non-volatiles returned to the reaction zone (tails), while still maintaining the desired aldehyde production rate, will ultimately determine the maximum concentration of heavies that the system may sustain. Once the heavies concentration limit is reached, they must be removed at a rate comparable to their formation rate to maintain the desired balance. One common method of heavies removal is volatilization; however, if the byproducts in question are too high-boiling to distill overhead (e.g., derived from higher olefins), it may be necessary to remove them from the system as a liquid purge stream (e.g. removal of separation zone liquid effluent) to extend catalyst life. Costs are associated with the liquid purge, including in the recovery of rhodium from the liquid purge.

Hydroformylation catalysts comprising rhodium and hydrolysable organophosphorous ligands such as organomonophosphites are capable of very high reaction rates (see, e.g., "Rhodium Catalyzed Hydroformylation," van Leeuwen, Claver, Kluwer Academic Pub. (2000)). Such catalysts have industrial utility, as they can be used to increase production rates, or to efficiently hydroformylate internal and/or branched internal olefins, which react more slowly than linear alpha olefins.

Accordingly, a number of processes have been developed to remove and recover rhodium from streams in hydroformylation processes such as liquid purge streams with heavies; examples include the use of concentrated phosphoric acid to selectively separate the phosphine (see, e.g., U.S. Pat. Nos. 4,242,284 and 4,710,587), the use of membrane or nano-filtration processes (see, e.g., U.S. Pat. Nos. 5,395,979 and 5,681,473), oxidation processes (see, e.g., U.S. Pat. Nos. 4,021,463, 4,196,096, 4,374,278, 4,400,547, 4,528,403, 4,605,780, and 5,290,743), and others. It would be desirable to have alternative processes for recovering rhodium from hydroformylation processes, particularly in the hydroformylation of higher olefins, with minimal introduction of components that would interfere with the hydroformylation process.

SUMMARY

The present invention, in some embodiments, advantageously provides a process that can permit the recovery of rhodium from a liquid purge stream in a hydroformylation process using a reasonable number of process steps. In some embodiments, such processes can advantageously return a high percentage of the rhodium back to the hydroformylation process in an active form for further use in hydroformylation, rather than sending it to a precious metal recovery operation. In some embodiments, processes of the present invention can advantageously return active rhodium back to a hydroformylation process in a manner that minimizes decomposition of the organophosphorous ligand used for hydroformylation.

In one aspect, a process for the recovery of rhodium from a catalyst purge stream from a $C_6$ or higher olefin hydroformylation process comprises:
  (a) treating a catalyst-containing liquid purge stream from the hydroformylation process, wherein the catalyst comprises a precious metal and an organophosphorous ligand, with an oxidant in the presence of a separate liquid aqueous phase comprising a halide-free acid at a sufficient temperature to effect oxidation of a majority of the contained organophosphorous ligand, wherein the halide-free acid is a $C_1$-$C_6$ organic acid or phosphorous acid;
  (b) recovering the aqueous phase;
  (c) contacting the aqueous phase with a separate organic phase by mixing the two phases under a syngas atmosphere, wherein the separate organic phase comprises water-insoluble, hydrolysable organophosphorous ligand and recycled olefin from a hydroformylation process; and
  (d) separating the organic phase to be recycled back to a hydroformylation process.

These and other embodiments are discussed in more detail in the Detailed Description below.

DETAILED DESCRIPTION

All references to the Periodic Table of the Elements and the various groups therein are to the version published in the CRC Handbook of Chemistry and Physics, 72nd Ed. (1991-1992) CRC Press, at page I-11.

Unless stated to the contrary, or implicit from the context, all parts and percentages are based on weight and all test methods are current as of the filing date of this application. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

As used herein, "a," "an," "the," "at least one," and "one or more" are used interchangeably. The terms "comprises," "includes," and variations thereof do not have a limiting meaning where these terms appear in the description and claims. Thus, for example, an aqueous composition that includes particles of "a" hydrophobic polymer can be interpreted to mean that the composition includes particles of "one or more" hydrophobic polymers.

As used herein, the term "ppmw" means parts per million by weight.

For purposes of this invention, the term "hydrocarbon" is contemplated to include all permissible compounds having at least one hydrogen and one carbon atom. Such permissible compounds may also have one or more heteroatoms. In a broad aspect, the permissible hydrocarbons include acyclic (with or without heteroatoms) and cyclic, branched and unbranched, carbocyclic and heterocyclic, aromatic and nonaromatic organic compounds that can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxyalkyl, aminoalkyl, in which the number of carbons can range from 1 to 20 or more, preferably from 1 to 12, as well as hydroxy, halo, and amino. The permissible substituents can be one or more and the same or different for appropriate organic compounds. This invention is not intended to be limited in any manner by the permissible substituents of organic compounds.

As used herein, the term "hydroformylation" is contemplated to include, but is not limited to, all hydroformylation processes that involve converting one or more substituted or unsubstituted olefinic compounds or a reaction mixture comprising one or more substituted or unsubstituted olefinic compounds to one or more substituted or unsubstituted aldehydes or a reaction mixture comprising one or more substituted or unsubstituted aldehydes. The aldehydes may be asymmetric or non-asymmetric.

The terms "reaction fluid," "reaction medium" and "catalyst solution" are used interchangeably herein, and may include, but are not limited to, a mixture comprising: (a) a metal-organophosphorous ligand complex catalyst, (b) free organophosphorous ligand, (c) aldehyde product formed in the reaction, (d) unreacted reactants, (e) a solvent for said metal-organophosphorous ligand complex catalyst and said free organophosphorous ligand, and, optionally, (f) one or more phosphorus acidic compounds, which may be dissolved and/or suspended, formed in the reaction. The reaction fluid can encompass, but is not limited to, (a) a fluid in a reaction zone, (b) a fluid stream on its way to a separation zone, (c) a fluid in a separation zone, (d) a recycle stream, (e) a fluid withdrawn from a reaction zone or separation zone, (f) a withdrawn fluid being treated with an acid removal system such as an extractor or other immiscible fluid contacting system, (g) a treated or untreated fluid returned to a reaction zone or separation zone, (h) a fluid in an external cooler, and (i) ligand decomposition products and components derived from them, such as oxides, sulfides, salts, oligomers, and the like.

As used herein, the term "spent catalyst" refers to a catalyst, which comprises a precious metal and an organophosporous ligand, that has degraded or become sufficiently contaminated as to not be economically feasible to use and needs to be replaced. In some embodiments, spent catalyst is a catalyst having an activity that is less than 75% of its initial activity (reaction rate). In some embodiments, a spent catalyst has an activity that is less than 50% of its initial activity (reaction rate). In a liquid purge operation, a portion of the catalyst is removed to allow for fresh catalyst to be added to the remaining catalyst which continues to operate but the purged stream is considered "spent catalyst" since it is not returned to the reactor.

As used herein, "spent catalyst fluid" and "catalyst-containing liquid purge stream" are used interchangeably and each refers to a fluid from a hydroformylation process that includes spent catalyst and may also include, but is not limited to, a mixture comprising: (a) a precious metal-organophosphorous ligand complex catalyst, (b) free organophosphorous ligand, (c) aldehyde product formed in the hydroformylation reaction, (d) unreacted reactants, (e) a solvent for said metal-organophosphorous ligand complex catalyst and said free organophosphorous ligand, (f) free precious metals and/or clusters comprising precious metal, and, optionally, (g) one or more phosphorus acidic compounds formed in the reaction (which may be homogeneous or heterogeneous). Additional contaminants may include aldehyde degradation products (e.g., carboxylic acids or alcohols and aldehyde condensation products), deactivated or poisoned catalyst, process fluids, water, line flushes, and the like. As used herein, the term "liquid purge stream" means a liquid stream in a hydroformylation process that is leaving a recycle process and is used to remove an accumulation of inerts, impurities, side-products, ligand degradation materials, and other unwanted materials that might otherwise build up.

As used herein, the term "recycled olefin" comprises a stream that has been recovered following a hydroformylation process or derived from such a stream such that the contained olefin has passed through a hydroformylation process at least once. This stream is typically generated after the product-catalyst separation process and usually as part of a downstream purification of the crude aldehyde product. Alternatively, the material may originate after further downstream refining of the resulting alcohol after hydrogenation of the aldehyde (recognizing that the stream at this point may have very low olefin content). In any event, the "recycled olefin" stream may contain significant levels of aldehyde, hydrocarbons (e.g., hydrogenated olefin), alcohols, and other materials but will preferably have less than 50 weight % oxygenates, preferably less than 20 weight % oxygenates, and most preferably, less than 5 weight % oxygenates, each based on the total weight of the stream, wherein these oxygenates comprise at least one aldehyde, ester, and/or alcohol derived from the original olefin feed. In some embodiments, "recycled olefin" refers to a stream that has passed through a hydroformylation process at least once and has passed through a product-catalyst separation process at least once, and the total amount of aldehydes, esters, and/or alcohols in the recycled olefin is less than 5 weight percent.

A "recycled olefin" stream exhibits lower reactivity than an original olefin feed to a hydroformylation process such that during step (c) of the recovery process described herein below (contacting the aqueous phase with a separate organic phase by mixing the two phases under a syngas atmosphere, wherein the separate organic phase comprises water-insoluble, hydrolysable organophosphorous ligand and recycled olefin from a hydroformylation process), the amount of aldehyde formed during the syngas treatment is minimized. The lower reactivity is generally due to reduced levels of linear alpha olefin content (e.g., $H_2C=CH-CH_2-$ moieties) in the recycled olefin stream. Examples of these lower reactivity olefins are isomerized olefins (e.g., internal olefins) or branched olefins (e.g., $H_2C=C(Me)$-

CH₂—) and the like. The reactivity of olefins and olefin mixtures can be measured by a number of well-known techniques; for example by determining the production rate under hydroformylation conditions, which may be generally represented in units of gmol/L/hr (moles of aldehyde produced per liter of catalyst solution per hour) under a set of specified conditions such as temperature, catalyst concentration, and syngas partial pressures. Under normal conditions with C6 and higher olefins, the more reactive olefins are consumed rapidly such that the recovered unreacted olefins are those which exhibit much lower reactivity and are thus well-suited for use in embodiments of the present invention.

The term "free ligand" means ligand that is not complexed with (or bound to) the metal, e.g., metal atom, of the complex catalyst.

"Hydrolysable organophosphorous ligands" are trivalent phosphorous $P^{(III)}$ ligands that contain at least one P—Z bond wherein Z is oxygen, nitrogen, chlorine, fluorine, or bromine. Examples of hydrolysable organophosphorous ligands include, but are not limited to, phosphites, phosphino-phosphites, bisphosphites, phosphonites, bisphosphonites, phosphinites, phosphoramidites, phosphino-phosphoramidites, bisphosphoramidites, fluorophosphites, and the like. In some embodiments the ligands are monodentate hydrolysable organophosphorous ligands. In some emobidments, the ligands may include bidentate compounds capable of forming chelate complexes with precious metals and/or may contain multiple P—Z moieties such as polyphosphites, polyphosphoramidites, and others, as well as mixed P—Z moieties such as phosphite-phosphoramidites, fluorophosphite-phosphites, and the like. In some embodiments, mixtures of ligands may be employed.

As used herein, the terms "heavy byproducts" and "heavies" are used interchangeably and refer to byproducts from a hydroformylation process that have a normal boiling point that is at least 25° C. above the normal boiling point of the desired product of the hydroformylation process (i.e., the desired aldehyde). Such materials are known to form in hydroformylation processes under normal operation through one or more side reactions, including for example, by aldol condensation or ligand degradation. Non-limiting examples of heavies are described, for example, in U.S. Pat. No. 4,148,830.

As used herein, the term "dimer" refers to heavy byproducts derived from two molecules of aldehyde. Likewise the term "trimer" refers to heavy byproducts derived from three molecules of aldehyde.

As used herein, the terms "isononyl aldehydes" and "mixed C9 aldehydes" are used interchangeably and refer to a fluid comprised of two or more aldehyde isomers, where each of the isomers contains nine carbon atoms. Illustrative examples of C9 aldehydes include n-nonanal, 2-methyloctanal, 3-methyloctanal, 4-methyloctanal, 5-methyloctanal, 6-methyloctanal, 7-methyloctanal, 2-ethylheptanal, 2-propylhexanal, 3-propylhexanal, 4,5-dimethylheptanal, 2,3,4-trimethylhexanal, 3-ethyl-4-methylhexanal, 2-ethyl-4-methylhexanal, 2-propyl-3-methylpentanal, 2,5-dimethylheptanal, 2,3-dimethylheptanal, and the like.

As used herein, the terms "separation zone" and "vaporizer" are used interchangeably and refer to a product-catalyst separation device, such as a distillation device, wherein the product aldehyde is volatilized overhead, condensed and collected, while the non-volatile concentrated effluent (tails, or vaporizer tails) containing the homogeneous catalyst is returned to one or more of the reactors. The separation zone temperature is typically higher than the hydroformylation reactor temperature, and may optionally be operated at reduced pressure. In one embodiment, a vaporizer features flowing gas of varying composition that aids in product removal and optionally helps stabilize the catalyst ("strip gas vaporizer"). Other product-catalyst separation devices include membrane, phase separation, and extraction processes. The nature of the product-catalyst separation device is not critical to the present invention.

As used herein, the terms "feed to tails" and "feed to tails ratio" are used interchangeably and refer to the mass of reaction fluid entering the separation zone relative to the mass of separation zone tails leaving the bottom of the separation zone and returning to the hydroformylation reactors. "Feed to tails" is an indicator of the rate at which volatiles, such as aldehyde product, are removed from the reaction fluid. For example, a "feed to tails ratio" of 2, means that the weight of reaction fluid entering the separation zone is two times greater than the weight of the concentrated effluent returned to the hydroformylation reactors.

Some embodiments of the present invention relate to processes for the recovery of rhodium in a hydroformylation process. Such rhodium recovery processes are particularly useful in hydroformylation processes that comprise producing at least one aldehyde in a reaction zone, the reaction zone comprising a $C_6$ to $C_{22}$ olefins, hydrogen, and carbon monoxide in the presence of a catalyst, wherein the catalyst comprises rhodium and an organophosphorus ligand.

In some embodiments, a process for the recovery of rhodium from a catalyst purge stream from a C6 or higher olefin hydroformylation process comprises:

(a) treating a catalyst-containing liquid purge stream from the hydroformylation process, wherein the catalyst comprises a precious metal and an organophosphorous ligand, with an oxidant in the presence of a separate liquid aqueous phase comprising a halide-free acid at a sufficient temperature to effect oxidation of a majority of the contained organophosphorous ligand, wherein the halide-free acid is a C1-C6 organic acid or phosphorous acid;

(b) recovering the aqueous phase;

(c) contacting the aqueous phase with a separate organic phase by mixing the two phases under a syngas atmosphere, wherein the separate organic phase comprises water-insoluble, hydrolysable organophosphorous ligand and recycled olefin from a hydroformylation process; and (d) separating the organic phase to be recycled back to a hydroformylation process. As used in step (a), a "majority" of the contained organophosphorous ligand means 50 weight % or more of the contained organophosphorous ligand in the liquid purge stream. For ligands with more than one phosphorous atom per molecule, a "majority" of the contained organophosphorous ligand means 50 weight % or more of all the phosphorous atoms in the contained organophosphorous ligand in the liquid purge stream. Quantifying the concentration of organophosphorous ligand and oxidized organophosphorous ligand (e.g., organophosphate) in the liquid purge stream may be accomplished by analytical techniques which are known to the skilled person, such as phosphorous NMR and high performance liquid chromatography (HPLC). HPLC is typically preferred and is thus the technique used hereunder to determine if a majority of the contained organophosphorous ligand is oxidized.

In some embodiments, the precious metal is rhodium and the organophosphorous ligand is a tertiary organophosphorous ligand. In some embodiments, the organophosphorous ligand is a monophosphite. In some embodiments, the oxidant is oxygen, air, oxygen diluted in an inert gas, hydrogen peroxide, an alkyl peroxide, an aryl peroxide, a dialkylperoxide, a diarylperoxide, or a peroxyacid having less than nine carbon atoms.

In some embodiments, the process further comprises, following recovery of the aqueous phase in step (b), treating the remaining organic phase from step (a) with water or with an aqueous solution comprising halide-free C1-C6 organic acid or phosphorous acid or with an oxidant in the presence of a separate liquid aqueous phase comprising halide-free C1-C6 organic acid or phosphorous acid, recovering a second aqueous phase, and combining the second aqueous phase with the aqueous phase in step (b) prior to step (c).

In some embodiments, the halide-free acid in step (a) is provided in an aqueous solution prior to treating the liquid purge stream, wherein the aqueous stream comprises at least 15 weight % halide-free acid in some embodiments, at least 25 weight % halide-free acid in some embodiments, and at least 40 weight % halide-free acid in some embodiments. In some embodiments, mixtures of halide-free acids are provided. In some embodiments, the halide-free acid in step (a) is a halide-free C1-C2 organic acid or phosphorous acid. In some such embodiments, a mixture of halide-free C1-C2 organic acids or phosphorous acid is used. Examples of halide-free C1-C2 organic acids that can be used in some embodiments of the present invention include formic acid, acetic acid, glycolic acid, and oxalic acid, with acetic acid being particularly useful.

In some embodiments, the recycled olefin used in step (c) is from a different hydroformylation process than the catalyst-containing liquid purge stream. In some embodiments, the recycled olefin used in step (c) is from the same hydroformylation process as the catalyst-containing liquid purge stream. The recycled olefin, in some embodiments, is C6 or higher and has a lower hydroformylation activity than an olefin feed used in the hydroformylation process that generated the catalyst-containing liquid purge stream. In some embodiments, the recycled olefin is C6 or higher and has a higher average degree of branching than an olefin feed used in the hydroformylation process that generated the catalyst-containing liquid purge stream. Without being bound to any particular theory, because the oxidation process may generate organic acids derived from the product aldehyde or heavies, it is believed that the addition of recycled olefin may help mitigate the effect of high molecular weight acids, which tend to form surfactants and emulsions. This may also reduce the amount of halide-free C1-C2 organic acids or phosphorous acid that is present in the organic phase which may be useful for the organic phase to be used in downstream operations as well as minimize halide-free C1-C2 organic acids or phosphorous acid losses.

In some embodiments, the process further comprises washing the organic phase from step (d) with an aqueous wash prior to sending the organic phase to the hydroformylation process. In some embodiments, the aqueous wash comprises a water soluble amine. In some embodiments, a water soluble amine has the following structure:

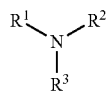

wherein $R^1$, $R^2$, and $R^3$ are each independently alkyls and ethoxylates, and wherein no more than one of $R^1$, $R^2$, and $R^3$ is alkyl. In some embodiments, $R^1$, $R^2$, and $R^3$ are each ethoxylates. In some embodiments, the concentration of the amine is 1.5 to 20 weight percent, based on the total weight of the aqueous wash and the amount of amine-containing solution is between 2.5 to 50 wt % that of the organic phase. The water soluble amine, in some embodiments, is triethanolamine. In some embodiments, buffer salts may be used in place of the water soluble amine; such buffers are described in U.S. Pat. No. 5,741,944 and PCT Publication No. WO2013184350. In some embodiments, if the aqueous wash does not include a water soluble amine or a buffer, the decanted bottom water layer may be recycled as part of the initial liquid aqueous phase used in step (a).

In some embodiments, the process further comprises following recovery of the aqueous phase in step (b), sparging the aqueous phase with an inert gas or syngas prior to introduction of the water-insoluble, hydrolysable organophosphorous ligand in step (c). In some embodiments, the inert gas comprises nitrogen, argon, helium, or methane.

In some embodiments, processes of the present invention further comprise returning the organic phase comprising the precious metal-organophosphorous complex to a reaction zone in the hydroformylation process. In some embodiments, processes of the present invention further comprise providing the organic phase comprising the precious metal-organophosphorous complex to the hydroformylation process prior to a product-catalyst separation zone such that any residual halide-free C1-C6 organic acid or phosphorous acid may be removed with the product prior to the material being returned to the reaction zone. In some embodiments, processes of the present invention further comprise providing the organic phase comprising the precious metal-organophosphorous complex to the hydroformylation process prior to or at an aqueous extractor as described in U.S. Pat. No. 5,741,944 prior to entering the reaction zone.

Hydrogen and carbon monoxide are required for the process. These may be obtained from any suitable source, including petroleum cracking and refinery operations. Syngas mixtures are commonly used as a source of hydrogen and CO.

As used herein, "syngas" (from synthesis gas) refers to a gas mixture that contains varying amounts of CO and $H_2$. Production methods are well known and include, for example: (1) steam reforming and partial oxidation of natural gas or liquid hydrocarbons, and (2) the gasification of coal and/or biomass. Hydrogen and CO typically are the main components of syngas, but syngas may contain carbon dioxide and inert gases such as $CH_4$, $N_2$ and Ar. The molar ratio of $H_2$ to CO varies greatly but generally ranges from 1:100 to 100:1 and preferably between 1:10 and 10:1. Syngas is commercially available and is often used as a fuel source or as an intermediate for the production of other chemicals. The most preferred $H_2$:CO molar ratio for chemical production is between 3:1 and 1:3 and usually is targeted to be between about 1:2 and 2:1 for most hydroformylation applications.

The olefin starting material reactants that may be employed in the hydroformylation process of this invention include both optically active (prochiral and chiral) and non-optically active (achiral) olefinic unsaturated compounds containing from 6 to 22, preferably 8 to 22, and more preferably 8 to 20 carbon atoms. Such olefinic unsaturated compounds can be substituted or unsubstituted, terminally or internally unsaturated, straight-chain, branched chain or cyclic. Olefin mixtures, such as obtained from the oligomerization of propene, butene, isobutene, etc. (such as so called dimeric, trimeric or tetrameric butenes and the like, as disclosed, for example, in U.S. Pat. Nos. 4,518,809 and 4,528,403) can be employed. Moreover, such olefin compounds may further contain one or more additional ethylenic unsaturated groups, and mixtures of two or more different olefinic unsaturated compounds may be employed as the starting hydroformylation material if desired. For example, commercial alpha olefins containing eight or more carbon atoms may contain minor amounts of corresponding internal olefins and/or their corresponding saturated hydrocarbon and such commercial olefins need not necessarily be purified from same prior to being hydroformylated. Illustrative mixtures of olefinic starting materials that can be employed in the hydroformylation reactions include, for example, mixed butene dimers and trimers. Further, such olefinic unsaturated compounds and the corresponding aldehyde products derived therefrom may also contain one or more groups or substituents that do not unduly adversely affect the hydroformylation process or the process of this invention such as described, for example, in U.S. Pat. Nos. 3,527,809, 4,769, 498 and the like.

Embodiments of the present invention are especially useful for the production of non-optically active aldehydes, by hydroformylating achiral alpha-olefins containing from 6 to 22, preferably 8 to 20, carbon atoms, and achiral internal olefins containing from 8 to 20 carbon atoms as well as starting material mixtures of such alpha olefins and internal olefins.

Illustrative alpha and internal olefins include, for example, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 2-heptene, 2-octene, propylene dimers, propylene trimers, propylene tetramers, 2-ethyl-1-hexene, and the like including mixtures thereof.

A solvent advantageously is employed in the hydroformylation process. Any suitable solvent that does not unduly interfere with the hydroformylation process can be used. By way of illustration, suitable solvents for rhodium catalyzed hydroformylation include those disclosed, for example, in U.S. Pat. Nos. 3,527,809; 4,148,830; 5,312,996; and 5,929, 289. Non-limiting examples of suitable solvents include saturated hydrocarbons (alkanes), aromatic hydrocarbons, water, ethers, polyethers, alkylated polyethers, aldehydes, ketones, nitriles, alcohols, esters, and aldehyde condensation products. Specific examples of solvents include: tetraglyme, pentanes, cyclohexane, heptanes, benzene, xylene, toluene, diethyl ether, tetrahydrofuran, butyraldehyde, and benzonitrile. The organic solvent may also contain dissolved water up to the saturation limit. Illustrative solvents employable in the production of aldehydes include ketones (e.g. acetone and methylethyl ketone), esters (e.g. ethyl acetate, di-2-ethylhexyl phthalate, 2,2,4-trimethyl-1,3-pentanediol monoisobutyrate), hydrocarbons (e.g. toluene), nitrohydrocarbons (e.g. nitrobenzene), ethers (e.g. tetrahydrofuran (THF)) and sulfolane. In rhodium catalyzed hydroformylation, it may be desirable to employ, as a primary solvent, aldehyde compounds corresponding to the aldehyde products desired to be produced and/or higher boiling aldehyde liquid condensation by-products, for example, as might be produced in situ during the hydroformylation process, as described for example in U.S. Pat. Nos. 4,148,830 and 4,247,486. Indeed, while one may employ, if desired, any suitable solvent at the start-up of a continuous process, the primary solvent will normally eventually comprise both aldehyde products and higher boiling aldehyde liquid condensation by-products (heavies), due to the nature of the continuous process. The amount of solvent is not especially critical and need only be sufficient to provide the reaction medium with the desired amount of transition metal concentration. Typically, the amount of solvent ranges from about 5 percent to about 95 percent by weight, based on the total weight of the reaction fluid. Mixtures of two or more solvents may also be employed.

While the hydroformylation reaction includes a solvent as described in the preceding paragraph, other solvents may be used in processes of the present invention.

Prior to or during the treatment with an oxidant described in step (a) of the present invention, additional solvents may be optionally added especially if the purge stream is especially viscous. In such embodiments, these solvents should be of low polarity such as the C6 or higher olefin feed, a recycled olefin stream, hydrocarbons (e.g., hexane, heptane), aromatic hydrocarbons (e.g., toluene, xylene), and the like. Oxygen-containing, halogen-containing, or nitrogen-containing solvents are preferably not added in this step.

The solvent used in step (d) of the present invention is different from the solvent used in the hydroformylation process and is referred to herein as the "recovery solvent." The recovery solvent comprises at least 50% recycled olefin as defined herein. Preferably the recovery solvent comprises at least 70% and most preferably greater than 90% of recycled olefin with added hydrolysable organophosphorous ligand. Additional solvents such as those used in the hydroformylation process (described above) and/or fresh olefin feed may also be used as part of the recovery solvent.

Catalysts useful in hydroformylation processes comprise a catalytic or precious metal. The precious metal can include Group 8, 9 and 10 metals selected from rhodium (Rh), cobalt (Co), iridium (Ir), ruthenium (Ru), iron (Fe), nickel (Ni), palladium (Pd), platinum (Pt), osmium (Os) and mixtures thereof, with preferred metals being rhodium, cobalt, iridium and ruthenium, more preferably rhodium, cobalt and ruthenium, especially rhodium. The initial active metal may be delivered to the hydroformylation reaction system as a catalyst precursor or as an activated catalyst as described in U.S. Pat. No. 6,700,021. Embodiments of the present invention are particularly well-suited for the recovery of rhodium such that in some embodiments, the catalytic or precious metal is rhodium.

The number of available coordination sites on such metals is well known in the art. Thus the catalytic species, which may comprise a complex catalyst mixture, may comprise monomeric, dimeric or higher nuclearity forms, which are preferably characterized by at least one organophosphorous-containing molecule complexed per one molecule of metal, e.g., rhodium.

The catalysts, as well as methods for their preparation, are well known in the art and include those disclosed in the above-mentioned patents. In general, such catalysts consist essentially of metal in complex combination with an organophosphorous ligand. It is believed that carbon monoxide is also present and complexed with the metal in the active species. The active species may also contain hydrogen directly bonded to the metal.

The permissible organophosphorous ligands that make up the metal-organophosphorous ligand complexes and free organophosphorous ligand include mono-, di-, and triorganophosphites. Other organophosphorous ligand described above may also be used. Mixtures of such ligands may be employed if desired in the metal-organophosphorous ligand complex catalyst and/or free ligand and such mixtures may be the same or different. This invention is not intended to be limited in any manner by the permissible initial organophosphorous ligands or mixtures thereof. It is to be noted that the successful practice of this invention does not depend and is not predicated on the exact structure of the initial metal-organophosphorous ligand complex species, which may be present in their mononuclear, dinuclear and/or higher nuclearity forms. Indeed, the exact structure is not known. While not intending to be bound to any theory or mechanistic discourse, it appears that the catalytic species may in its simplest form consist essentially of the metal in complex combination with the organophosphorous ligand and carbon monoxide and/or hydrogen. During the oxidation step (a), the organophosphorous ligands will be converted to their oxides and removed from the metal-organophosphorous ligand complex. Thus the nature of the initial organophosphorous ligand is not critical to the present invention since they are destroyed in step (a).

The oxidation conditions in step (a) in some embodiments of the inventive process are chosen to effect substantial and preferably complete oxidation of the contained organophosphorous ligand while minimizing the oxidation of contained residual aldehyde. The nature of the oxidant and the organophosphorous ligand, reaction time, and reaction temperature will impact the rate and extent of organophosphorous ligand oxidation. Some guidance in selective oxidation of organophosphorous ligands is given in U.S. Pat. No. 4,605,780, for example. The progress of the oxidation can be readily monitored by a variety of common analytical techniques such as high pressure liquid chromatography, gas chromatography, or $^{31}$P NMR. Excessive oxidation conditions should be avoided to minimize the oxidation of the contained residual aldehyde products in the organic phase to their corresponding carboxylic acids. The amount of organic acids formed can also be monitored by conventional means such as gas chromatography.

The mixture should be well mixed during the oxidation of step (a) in some embodiments to enable transfer of the liberated precious metal from the organic phase to the aqueous phase. However, it is important that the resulting phases readily separate to facilitate recovery of the aqueous phase. Thus, minimizing the polarity of the organic phase by minimizing the amount of polar organic compounds (e.g., oxygen, nitrogen, and halide-containing organic compounds) is desired. Minimizing the content of aldehydes and higher acids (C6 and above) in the organic phase are important to embodiments of the present invention. This can be accomplished, for example, by removing as much of the aldehyde product as possible prior to the oxidation in step (a) by using a product-catalyst separation unit. If additional solvent is added to step (a) to reduce viscosity, the solvent should generally be selected to contain minimal amounts of oxygen, nitrogen, and halide-containing organic compounds.

The hydrolysable organophosphorous ligand that is added in step (c) is preferably insoluble in water (no more than 0.1 wt % in water in some embodiments, 0.01 wt % in water in some embodiments, and preferably no more than 0.001 wt % in water). The resulting catalyst solution in the organic phase may then be added to a hydroformylation process with different ligands including a mixture of hydrolysable and non-hydrolysable ligands. The ligand added in step (c) is preferably a ligand used in the original hydroformylation process that generated the initial purge stream but the recovered catalyst solution may be used in a different hydroformylation process unit.

The term "complex" as used herein means a coordination compound formed by the union of one or more electronically rich molecules or atoms capable of independent existence with one or more electronically poor molecules or atoms, each of which is also capable of independent existence. Carbon monoxide, which is also properly classified as a ligand, can also be present and coordinated to the metal. The ultimate composition of the complex catalyst may also contain an additional ligand, e.g., hydrogen or an anion satisfying the coordination sites or nuclear charge of the metal. Illustrative additional ligands include, for example, alkyl, aryl, substituted aryl, acyl, CN, $(R)_2PO$ and $RP(O)(OH)O$ (wherein each R is the same or different and is a substituted or unsubstituted hydrocarbon radical, e.g., the alkyl or aryl), acetate, acetylacetonate, $SO_4$, $PF_4$, $PF_6$, $NO_2$, $NO_3$, $CH_3$, $CH_2=CHCH_2$, $CH_3CH=CHCH_2$, $C_6H_5CN$, $CH_3CN$, $NH_3$, pyridine, $(C_2H_5)_3N$, mono-olefins, diolefins and triolefins, tetrahydrofuran, and the like. The complex species are preferably free of any additional organic ligand or anion that might poison the catalyst or have an adverse effect on catalyst performance. It is preferred in the metal-organophosphorous ligand complex catalyzed hydroformylation reactions that the active catalysts be free of halogen and sulfur directly bonded to the metal, although such may not be absolutely necessary.

The organophosphorous compounds that may serve as the ligand of the metal-organophosphorous ligand complex catalyst and/or free ligand may be of the achiral (optically inactive) or chiral (optically active) type and are well known in the art. Achiral organophosphorous ligands are preferred.

Such organophosphorous ligands and/or methods for their preparation are well known in the art and include, for example, organophosphite ligands. As used herein, "mono-organophosphite ligands" are compounds containing a single phosphorous atom bound to three oxygen atoms; the three oxygen atoms are each additionally bound to carbon moieties. Illustrative examples include, but are not limited to monoorganophosphite, diorganophosphite, and triorganophosphite compounds, examples of which include: tris(2,4-di-t-butylphenyl)phosphite, 4,8-di-tert-butyl-6-(2-(tert-butyl)-4-methoxyphenyl)-2,10-dimethoxydibenzo[d,f][1,3,2]dioxaphosphepine, and the like.

Representative monoorganophosphites may include those having the formula:

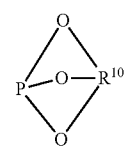

<<I>> wherein $R^{10}$ represents a substituted or unsubstituted trivalent hydrocarbon radical containing from 4 to 40 carbon atoms or greater, such as trivalent acyclic and trivalent cyclic radicals, e.g., trivalent alkylene radicals such as those derived from 1,2,2-trimethylolpropane and the like, or trivalent cycloalkylene radicals such as those derived from 1,3,5-trihydroxycyclohexane, and the like. Such monoorganophosphites may be found described in greater detail, for example, in U.S. Pat. No. 4,567,306.

Representative diorganophosphites may include those having the formula:

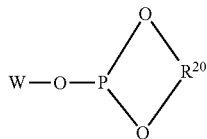

<<II>> wherein $R^{20}$ represents a substituted or unsubstituted divalent hydrocarbon radical containing from 4 to 40 carbon atoms or greater and W represents a substituted or unsubstituted monovalent hydrocarbon radical containing from 1 to 36 carbon atoms or greater.

Representative substituted and unsubstituted monovalent hydrocarbon radicals represented by W in the above Formula (II) include alkyl and aryl radicals, while representative substituted and unsubstituted divalent hydrocarbon radicals represented by $R^{20}$ include divalent acyclic radicals and divalent aromatic radicals. Illustrative divalent acyclic radicals include, for example, alkylene, alkylene-oxy-alkylene, alkylene-S-alkylene, cycloalkylene radicals, and, alkylene-$NR^{24}$-alkylene wherein $R^{24}$ is hydrogen or a substituted or unsubstituted monovalent hydrocarbon radical, e.g., an alkyl radical having 1 to 4 carbon atoms. The more preferred divalent acyclic radicals are the divalent alkylene radicals such as disclosed more fully, for example, in U.S. Pat. Nos. 3,415,906 and 4,567,302 and the like. Illustrative divalent aromatic radicals include, for example, arylene, bisarylene, arylene-alkylene, arylene-alkylene-arylene, arylene-oxy-arylene, arylene-$NR^{24}$-arylene wherein $R^{24}$ is as defined above, arylene-S-arylene, and arylene-S-alkylene, and the like. More preferably $R^{20}$ is a divalent aromatic radical such as disclosed more fully, for example, in U.S. Pat. Nos. 4,599,206, 4,717,775, and 4,835,299, and PCT Publication WO2016087301, and the like.

Representative of a more preferred class of diorganophosphites are those of the formula:

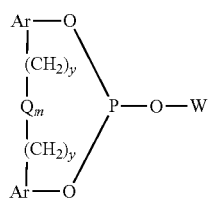

<<III>> wherein W is as defined above, each Ar is the same or different and represents a substituted or unsubstituted aryl radical, each y is the same or different and is a value of 0 or 1, Q represents a divalent bridging group selected from —C($R^{35}$)$_2$—, —O—, —S—, —$NR^{36}$—, Si($R^{37}$)$_2$ and —CO—, wherein each $R^{35}$ is the same or different and represents hydrogen, an alkyl radical having from 1 to 12 carbon atoms, phenyl, tolyl, and anisyl, $R^{36}$ is as defined above, each $R^{37}$ is the same or different and represents hydrogen or a methyl radical, and m has a value of 0 or 1. Such diorganophosphites are described in greater detail, for example, in U.S. Pat. Nos. 4,599,206, 4,717,775, and 4,835, 299, and PCT Publication WO2016087301.

Representative triorganophosphites may include those having the formula:

<<IV>> wherein each $R^{46}$ is the same or different and is a substituted or unsubstituted monovalent hydrocarbon radical e.g., an alkyl, cycloalkyl, aryl, alkaryl and aralkyl radicals that may contain from 1 to 24 carbon atoms. Illustrative triorganophosphites include, for example, trialkyl phosphites, dialkylaryl phosphites, alkyldiaryl phosphites, triaryl phosphites, and the like, such as, for example, trimethyl phosphite, triethyl phosphite, butyldiethyl phosphite, tri-n-propyl phosphite, tri-n-butyl phosphite, tri-2-ethylhexyl phosphite, tri-n-octyl phosphite, tri-n-dodecyl phosphite, dimethylphenyl phosphite, diethylphenyl phosphite, methyldiphenyl phosphite, ethyldiphenyl phosphite, triphenyl phosphite, trinaphthyl phosphite, bis(3,6,8-tri-t-butyl-2-naphthyl)methylphosphite, bis(3,6,8-tri-t-butyl-2-naphthyl)cyclohexylphosphite, tris(3,6-di-t-butyl-2-naphthyl)phosphite, bis(3,6,8-tri-t-butyl-2-naphthyl)(4-biphenyl)phosphite, bis(3,6,8-tri-t-butyl-2-naphthyl)phenylphosphite, bis(3,6,8-tri-t-butyl-2-naphthyl)(4-benzoylphenyl)phosphite, bis(3,6,8-tri-t-butyl-2-naphthyl)(4-sulfonylphenyl)phosphite, and the like. The most preferred triorganophosphite is tris(2,4-di-t-butylphenyl)phosphite. Such triorganophosphites are described in greater detail, for example, in U.S. Pat. Nos. 3,527,809 and 4,717,775 and US Publication No. US20150336093.

If desired, make-up or additional organophosphorous ligand can be supplied to the reaction medium of the hydroformylation process at any time and in any suitable manner, e.g., to maintain a predetermined level of free ligand in the reaction medium.

The use of an aqueous buffer solution to prevent and/or lessen hydrolytic degradation of an organophosphorous ligand and deactivation of a metal-organophosphorous ligand complex is disclosed in U.S. Pat. No. 5,741,942. Aqueous buffers used in U.S. Pat. No. 5,741,944 are generally salts of weak acids or bases but are usually Group 1 or 2 metal (Na, K, Ca, etc.) salts of weak acids. In some cases where amines are used, they generate ionic salts, such as ammonium salts, when they neutralize and remove at least some amount of the phosphorus acidic compounds from the reaction fluid. The aqueous buffer solutions employable in this invention may comprise any suitable buffer mixture containing salts of oxyacids, the nature and proportions of which in the mixture are such that the pH of their aqueous solutions may range from 3 to 9, preferably from 4 to 8 and more preferably from 4.5 to 7.5. In this context suitable buffer systems may include mixtures of anions selected from the group consisting of phosphate, carbonate, citrate, maleate, fumarate, and borate compounds and cations selected from the group consisting of ammonium and alkali metals, e.g. sodium, potassium and the like. Such buffer systems and/or methods for their preparation are well known in the art. The use of a buffer extractor particularly in the stream with the recovered rhodium to remove acids or other impurities prior to being introduced back into the reaction system is preferred.

The hydroformylation products may be asymmetric, non-asymmetric or a combination thereof, with the preferred products being non-asymmetric. The process may be conducted in any batch, continuous or semi-continuous fashion and may involve any catalyst liquid and/or gas recycle operation desired.

The recycle procedure generally involves withdrawing a portion of the liquid reaction medium containing the catalyst and aldehyde product from the hydroformylation reactor, i.e., reaction zone, either continuously or intermittently, and recovering the aldehyde product therefrom by use of a composite membrane, such as disclosed in U.S. Pat. Nos. 5,430,194 and 5,681,473, or by distilling it (e.g., vaporization separation), in one or more stages under normal, reduced or elevated pressure, as appropriate, in a separate distillation zone, the non-volatilized metal catalyst containing residue being recycled to the reaction zone as disclosed, for example, in U.S. Pat. No. 5,288,918. Condensation of the volatilized materials, and separation and further recovery thereof, e.g., by further distillation, can be carried out in any conventional manner, the crude aldehyde product can be passed on for further purification and isomer separation, if desired, and any recovered reactants, e.g., olefinic starting material and syngas, can be recycled in any desired manner to the hydroformylation process (reaction zone or reactor). The recovered metal catalyst containing raffinate of such membrane separation or recovered non-volatilized metal catalyst containing residue of such vaporization separation can be recycled, to the hydroformylation process (reaction zone or reactor) in any conventional manner desired.

In addition to other components discussed herein, the hydroformylation reaction mixture compositions employable herein can and normally will contain minor amounts of additional ingredients such as those that have either been deliberately employed in the hydroformylation process or formed in situ during said process. Examples of such ingredients that can also be present include unreacted olefin starting material, carbon monoxide and hydrogen gases, and in situ formed type products, such as saturated hydrocarbons and/or unreacted isomerized olefins corresponding to the olefin starting materials, ligand degradation compounds, and high boiling liquid aldehyde condensation by-products, polymeric catalyst stabilizers as described in U.S. Pat. No. 4,774,361 and PCT Publication No. WO2019/112866, as well as other inert co-solvent type materials or hydrocarbon additives, if employed.

The reaction conditions of the hydroformylation process encompassed by embodiments of the present invention may include any suitable hydroformylation conditions heretofore employed for producing optically active and/or non-optically active aldehydes. For instance, the total gas pressure of hydrogen, carbon monoxide and olefin starting compound of the hydroformylation process may range from 1 to 69,000 kPa. In general, however, it is preferred that the process be operated at a total gas pressure of hydrogen, carbon monoxide and olefin starting compound of less than 14,000 kPa and more preferably less than 3,400 kPa. The minimum total pressure is limited predominantly by the amount of reactants necessary to obtain a desired rate of reaction. More specifically the carbon monoxide partial pressure of the hydroformylation process of this invention is preferably from 1 to 6,900 kPa, and more preferably from 21 to 5,500 kPa, while the hydrogen partial pressure is preferably from 34 to 3,400 kPa and more preferably from 69 to 2,100 kPa. In general, $H_2$:CO molar ratio of gaseous hydrogen to carbon monoxide in a reaction zone may range from 1:10 to 100:1 or higher, the more preferred hydrogen to carbon monoxide molar ratio being from 1:10 to 10:1.

In general, the hydroformylation process may be conducted at any operable reaction temperature. Advantageously, the hydroformylation process is conducted at a reaction temperature from −25° C. to 200° C. In general, hydroformylation reaction temperatures of 50° C. to 120° C. are preferred for all types of olefinic starting materials. The hydroformylation reaction conditions employed will be governed by the type of aldehyde product desired.

The hydroformylation process of this invention may be carried out using one or more suitable reactors such as, for example, a fixed bed reactor, a fluid bed reactor, a tubular reactor, a venturi reactor, a bubble column reactor, a continuous stirred tank reactor (CSTR) or a slurry reactor. The optimum size and shape of the reactor will depend on the type of reactor used. As discussed further below, hydroformylation processes can comprise one more reaction zones, one or more separation zones, and one or more buffer treatment zones. The reaction zone(s) employed in this invention may be a single vessel or may comprise two or more discrete vessels. The separation zone(s) employed in this invention may be a single vessel or may comprise two or more discrete vessels. The buffer treatment zone(s) employed in this invention may be a single vessel or may comprise two or more discreet vessels. The reaction zone(s) and separation zone(s) employed herein may exist in the same vessel or in different vessels. For example, reactive separation techniques such as reactive distillation, reactive membrane separation and the like may occur in the reaction zone(s).

The hydroformylation process of this invention can be conducted in a batch or continuous fashion, with recycle of unconsumed starting materials if required. The hydroformylation reaction can be conducted in a single reaction zone or in a plurality of reaction zones, in series or in parallel or it may be conducted batchwise or continuously in an elongated tubular zone or series of such reaction zones. The materials of construction employed should be substantially inert to the starting materials during the reaction and the fabrication of the equipment should be able to withstand the reaction temperatures and pressures.

The hydroformylation process of this invention may be conducted in one or more steps or stages. The exact number of reaction steps or stages will be governed by the best compromise between capital costs and achieving high catalyst selectivity, activity, lifetime and ease of operability, as well as the intrinsic reactivity of the starting materials in question and the stability of the starting materials and the desired reaction product to the reaction conditions.

In an embodiment, the hydroformylation may be carried out in a multistaged reactor such as described, for example, in U.S. Pat. No. 5,728,893. Such multistaged reactors can be designed with internal, physical barriers that create more than one theoretical reactive stage per vessel. In effect, it is like having a number of reactors inside a single continuous stirred tank reactor vessel. Multiple reactive stages within a single vessel is a cost effective way of using the reactor vessel volume. It significantly reduces the number of vessels that otherwise would be required to achieve the same results. Fewer vessels reduces the overall capital required and maintenance concerns with separate vessels and agitators.

As indicated above, it is generally preferred to carry out the hydroformylation process of this invention in a continuous manner. In general, continuous hydroformylation processes are well known in the art and may involve: (a) hydroformylating the olefinic starting material(s) with carbon monoxide and hydrogen in a liquid homogeneous reaction mixture comprising a solvent, the metal-organophosphorous ligand complex catalyst, and free organophosphorous ligand; (b) maintaining reaction temperature and pressure conditions favorable to the hydroformylation of the olefinic starting material(s); (c) supplying make-up quantities of the olefinic starting material(s), carbon monoxide and hydrogen to the reaction medium as those reactants are used up; and (d) recovering the desired aldehyde hydroformylation product(s) in any manner desired. The continuous process can be carried out in a single pass mode, i.e., wherein a vaporous mixture comprising unreacted olefinic starting material(s) and vaporized aldehyde product is removed from the liquid reaction mixture from whence the aldehyde product is recovered and make-up olefinic starting material(s), carbon monoxide and hydrogen are supplied to the liquid reaction medium for the next single pass through without recycling the unreacted olefinic starting material(s). Such types of recycle procedure are well known in the art and may involve the liquid recycling of the metal-organophosphorous complex catalyst fluid separated from the desired aldehyde reaction product(s), such as disclosed, for example, in U.S. Pat. No. 4,148,830 or a gas recycle procedure such as disclosed, for example, in U.S. Pat. No. 4,247,486, as well as a combination of both a liquid and gas recycle procedure if desired. The most preferred hydroformylation process of this invention comprises a continuous liquid catalyst recycle process. Suitable liquid catalyst recycle procedures are disclosed, for example, in U.S. Pat. Nos. 4,668,651; 4,774,361; 5,102,505 and 5,110,990.

In an embodiment of this invention, the aldehyde product mixtures may be separated from the other components of the crude reaction mixtures in which the aldehyde mixtures are produced by any suitable method. Suitable separation methods include, for example, solvent extraction, crystallization, distillation, vaporization, wiped film evaporation, falling film evaporation, phase separation, filtration and the like or any combination thereof. It may be desired to remove the aldehyde products from the crude reaction mixture as they are formed through the use of trapping agents as described in PCT Publication No. WO 88/08835. One method for separating the aldehyde mixtures from the other components of the crude reaction mixtures is by membrane separation. Such membrane separation can be achieved as set out in U.S. Pat. Nos. 5,430,194 and 5,681,473.

As indicated above, at the conclusion of (or during) the process of this invention, the desired aldehydes may be recovered from the reaction mixtures used in the process of this invention. For example, the recovery techniques disclosed in U.S. Pat. Nos. 4,148,830 and 4,247,486 can be used. For instance, in a continuous liquid catalyst recycle process the portion of the liquid reaction mixture containing aldehyde product, catalyst, etc. (i.e., reaction fluid) removed from the reaction zone can be passed to a separation zone (e.g., vaporizer/separator) wherein the desired aldehyde product can be separated via distillation, in one or more stages, under normal, reduced or elevated pressure, from the liquid reaction fluid, condensed and collected in a product receiver, and further purified if desired. The remaining non-volatilized catalyst containing liquid reaction mixture (commonly referred to as "vaporizer tails" when a vaporizer is used) may then be recycled back to the reactor as may, if desired, any other volatile materials, e.g., unreacted olefin, together with any hydrogen and carbon monoxide dissolved in the liquid reaction after separation thereof from the condensed aldehyde product, e.g., by distillation in any conventional manner. In general, it is preferred to separate the desired aldehydes from the catalyst-containing reaction mixture under reduced pressure and at low temperatures so as to avoid possible degradation of the organophosphorous ligand and reaction products.

More particularly, distillation and separation of the desired aldehyde product from the metal-organophosphorous complex catalyst containing reaction fluid may take place at any suitable temperature desired. In general, it is preferred that such distillation take place at relatively low temperatures, such as below 150° C., and more preferably at a temperature in the range of from 50° C. to 140° C. It is also generally preferred that such aldehyde distillation take place under reduced pressure, e.g., a total gas pressure that is substantially lower than the total gas pressure employed during hydroformylation when low boiling aldehydes (e.g., $C_4$ to $C_6$) are involved or under vacuum when high boiling aldehydes (e.g. $C_7$ or greater) are involved. For instance, a common practice is to subject the liquid reaction product medium removed from the hydroformylation reactor to a pressure reduction so as to volatilize a substantial portion of the unreacted gases dissolved in the liquid medium that now contains a much lower synthesis gas concentration than is present in the reaction medium to the distillation zone, e.g. vaporizer/separator, wherein the desired aldehyde product is distilled. In general, distillation pressures ranging from vacuum pressures on up to total gas pressure of 340 kPa should be sufficient for most purposes.

It has been found that as the aldehyde molecular weight increases, the removal of the aldehyde condensation byproducts ("heavies") becomes more difficult especially with distillation processes. The elevated temperatures needed to vaporize these high molecular weight materials tend to generate even more heavies such that a practical limit is reached as these heavies build up to unacceptable levels. This process generally is catalyst-life limiting unless a catalyst purge is used as a secondary means to remove these heavies.

The present invention focuses on the recovery of rhodium from streams within the hydroformylation process. Some embodiments of the present invention are particularly useful in removing rhodium from a concentrated catalyst stream (i.e., a catalyst-containing liquid purge stream) following a product (aldehyde)/catalyst separation zone. For example, when a vaporizer is used to separate the aldehyde product, some embodiments of the present invention can be used to remove rhodium from the vaporizer tails which is a catalyst-containing liquid purge stream. As noted above, the catalyst in such liquid purge stream comprises a precious metal and an organophosphorous ligand.

According to embodiments of the present invention, the catalyst-containing liquid purge stream is treated with an oxidant to convert the organophosphorous (e.g., phosphorous (III) species) ligands to the corresponding oxides which are phosphorous (V) species and very poor ligands for precious metals. For purposes of the following discussion, the precious metal will be discussed as being rhodium, but it should be understood that the precious metal used in the catalyst can also be other precious metals as disclosed herein. In the presence of halide-free C1-C6 organic acids or halide-free phosphorous acids, it is believed that the liberated rhodium is captured by (complexed with) the carboxylates or phosphorous acid to form water soluble rhodium complexes. To maximize the partition of the rhodium into the aqueous phase, the amount of higher molecular weight acids such as acids derived from C7 and higher aldehyde products should be minimized. This is accomplished by only treating the purge stream with sufficient oxidant under mild conditions to maximize the organophosphorous oxidation while minimizing oxidation of residual aldehyde. In addition, it is preferable to perform this step on a concentrated catalyst purge stream which has substantially reduced concentrations of C7+ aldehyde (e.g., following a product-catalyst separation step).

For the purposes of this application, the phrase "halide-free" relative to the acids used during oxidation is used to denote that no added halide is present in the aqueous phase prior to mixing with the organic phase but recognizes that some halide may originate from the organic phase and enter the aqueous phase. The process of the present invention, in some embodiments, will reduce the ratio of halide:precious metal substantially (<0.01:1) during the processing such that the resulting precious metal-organophosphorous complex is substantially halide-free.

The oxidant used in some embodiments of the present invention is preferably oxygen, air, oxygen diluted in an inert gas (e.g., nitrogen, argon, helium, etc.), hydrogen peroxide, an alkyl peroxide, an aryl peroxide, a dialkylperoxide, a diarylperoxide, or a peroxyacid having less than nine carbon atoms (e.g., benzoyl peroxide).

Once the precious metal has been transferred to the aqueous phase, the organic phase comprising the heavies and other undesired materials (including the oxidized ligand) is removed. The precious metal component of the catalyst is then reconstituted by reversing the process by contacting the aqueous phase with an organic phase under a syngas atmosphere (a reducing environment), wherein the organic phase comprises water-insoluble hydrolysable organophosphorous ligand in a recycled olefin from a hydroformylation process. This advantageously forms a precious metal-organophosphorous complex (e.g., a new catalyst complex) in an active catalyst resting state. Because the precious metal-organophosphorous complex is not soluble in water, it migrates to the organic phase which can be then be separated and returned to a hydroformylation process.

Without being bound by theory, it is thought by using a low activity olefin (e.g., a recycled olefin from a hydroformylation process) to dissolve the water-insoluble, hydrolysable organophosphorous ligand under the conditions to regenerate the catalyst, very little aldehyde is generated in the process. Aldehyde, being more polar than the olefin, would tend to solubilize residual halide-free acids (e.g., C1-C6 organic acids or phosphorous acids) back into the organic phase and thus would disadvantageously be introduced to the hydroformylation process. Additionally, aldehyde would tend to increase the density of the recovery solvent, potentially reducing the efficiency of the phase separation step (d). By using a high molecular weight, lower reactivity recycled olefin stream, nothing new is being introduced to the hydroformylation process, and acidic carryover back to the hydroformylation process is minimized Lower acidity should reduce heavies formation and thus potentially reduce the need for the purge stream going forward.

The conditions to convert the water soluble precious metal species back to an organic soluble precious metal-organophosphorous complex (i.e., by contacting with water-insoluble hydrolysable organophosphorous ligand in a recycled olefin) are not narrowly critical. Conditions should be selected so as to be sufficient to convert the precious metal to a precious metal catalyst precursor or active precious metal catalyst while minimizing hydroformylation conversion of any contained olefin in the organic phase. In some embodiments, the step of contacting the aqueous phase with a separate organic phase (comprising water-insoluble, hydrolysable organophosphorous ligand and recycled olefin from a hydroformylation process) by mixing the two phases under a syngas atmosphere is conducted at a syngas pressure of 1 bar or higher. In some embodiments, such contacting step is conducted at a syngas pressure of 10 bars or higher. Such contacting is conducted at a syngas pressure of 20 bars or higher in some embodiments, although there is not believed to be any advantage associated with contacting at a syngas pressure of greater than 20 bars. Thus, in some embodiments, such contacting is conducted at a syngas pressure of up to 20 bars. In some embodiments, the step of contacting the aqueous phase with a separate organic phase (comprising water-insoluble, hydrolysable organophosphorous ligand and recycled olefin from a hydroformylation process) by mixing the two phases under a syngas atmosphere is conducted at a temperature between 0° C. and 150° C. In some embodiments, such contacting step is conducted at a temperature of 30° C. or higher. Such contacting is conducted at a temperature of 80° C. or higher in some embodiments. In some embodiments, such contacting is conducted at a temperature from 80° C. up to 150° C. Such contacting is conducted at a temperature of 80° C. up to 120° C. in some embodiments.

Hydroformylation reaction of the contained olefins in the organic phase would tend to increase the polar organic content of the organic phase which would tend to enhance the solubility of any acids in the aqueous phase; this would be undesired. The concentration of the resulting aldehyde and any contained acid in the organic phase can be readily monitored by conventional analytical techniques such as gas chromatography. The use of highly hindered recycled olefins can be particularly beneficial here in that their rates of conversion to aldehydes are very slow.

Surprisingly, despite the high concentration of C1-C6 acids or phosphorous acid in water, the amount of hydrolysis of the hydrolysable ligand is minimal under the conditions needed to effect the recovery of the precious metal. Without being bound by theory, it is thought that by minimizing the polar organic content of the organic phase, the water-insoluble hydrolysable organophosphorous ligand is protected from acid-catalyzed hydrolysis by minimizing the amount of water and acid that is present in the organic phase.

In an optional embodiment, the organic phase comprising the precious metal-organophosphorous complex may be washed with an aqueous wash comprising a water soluble amine prior to returning the organic phase to the hydroformylation zone. In some embodiments, the water-soluble amine has the following structure:

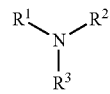

wherein $R^1$, $R^2$, and $R^3$ are each independently alkyls and ethoxylates, and wherein no more than one of $R^1$, $R^2$, and $R^3$ is alkyl. In some embodiments, to the extent one of $R^1$, $R^2$, and $R^3$ is an alkyl, the alkyl is either methyl or ethyl. In some embodiments, $R^1$, $R^2$, and $R^3$ are each ethoxylates. For the purpose of this disclosure, an "ethoxylate" is a (—CH$_2$—CH$_2$—O)$_n$H moiety wherein n is equal to 1 or 2. A particularly desirable water-soluble organic amine for use in embodiments of the present invention is triethanolamine.

Advantageously, the water-soluble amine has the following two properties: 1) it is weakly basic in order to avoid heavies formation in the reaction zone; and 2) it is water-soluble to avoid accumulation in the reaction fluid. The alkalinity or basicity of the water-soluble amine is generally reported as the pKa of the conjugate acid, which advantageously is from 5 to 11 at the temperature of the extraction zone. The pKa is from 6.0 to 9.5 in some embodiments, and is from 6.5 to 9.0 in some particularly desirable embodiments. Candidates for the amine can be tested for heavies formation by heating the product aldehyde with the amine at elevated temperature. Acceptable amines will exhibit less than 1 gram of heavies formation per liter of test solution per day at hydroformylation temperatures. The amount of heavies formation can be readily determined by gas or liquid chromatography, as is known to those skilled in the art. The minimum water solubility is at least 5% soluble in water at 25° C. and preferably miscible with water at 25° C. and higher.

The water-soluble amine solution is employed in an amount sufficient to generate a separate phase when heated under syngas. Mixtures of amines can be employed. In some embodiments, the water-soluble amine solution is employed in an amount to provide 2.5 to 50 weight percent of the amine solution in the organic phase with the precious metal-organophosphorous complex, based on the total weight of the organic phase. The water-soluble amine solution is employed, in some embodiments, in an amount to provide 2.5 to 10 weight percent of the amine solution in such organic phase, based on the total weight of the organic phase. In some embodiments, the water-soluble amine is employed in an amount to provide 2.5 to 5 weight percent of the amine solution in such organic phase, based on the total weight of the organic phase. The concentration of the amine in the aqueous solution can be measured by conventional techniques well-known to those skilled in the art including, for example, gas chromatography and liquid chromatography. The amount of amine solution is not critical but should be suffient to generate a separate phase to be decanted.

In some embodiments, the aqueous wash with the water soluble amine can be present when the aqueous phase is contacted with the solution of water-insoluble, hydrolysable organophosphorous ligand dissolved at least in part in recycled olefin to form a precious metal-organophosphorous complex in an organic phase. In such embodiments, the presence of the water soluble amine can advantageously prevent or reduce hydrolysis of the fresh hydrolysable ligand catalyzed by residual C1-C6 organic acid or phosphorous acid.

Residual water soluble amines as described herein may be present in the stream being returned to the hydroformylation process and optionally can be removed by an aqueous extractor that may already be in place to control system acidity as described in U.S. Pat. Nos. 5,741,942 and 5,741,944. Alternatively, batchwise or periodic water washing of the organic phase with the precious metal-organophosphorous complex, or portions thereof, can be performed to remove the water soluble amines and other polar contaminants.

The amount of water insoluble, hydrolysable organophosphorous ligand added to form the precious metal-organophosphorous complex in the organic phase is not particularly critical but should constitute at least 2 equivalents of phosphorous (III) per mole of precious metal in some embodiments, more than 10 equivalents per mole of precious metal in some embodiments, and more than 15 equivalents per mole of precious metal in some embodiments. There does not appear to be a particular advantage in adding more than 20 moles of hydrolysable organophosphorous ligand per mole of precious metal, and the total amount to add is generally limited by solubility of the ligand in the solvent and the amount of ligand to be charged to the hydroformylation zone.

Illustrative non-optically active aldehyde products that can be made in a hydroformylation process to which the organic phase comprising the precious metal-organophosphorous complex from the inventive process is added include e.g., heptanal, octanal, nonanal, 2-methyl-1-octanal, 2-ethyl 1-heptanal, 3-propyl 1-hexanal, decanal, adipaldehyde, 2-methylglutaraldehyde, 2-methyladipaldehyde, 3-methyladipaldehyde, 2-methyl-1-nonanal, undecanal, 2-methyl 1-decanal, dodecanal, 2-methyl 1-undecanal, tridecanal, 2-methyl 1-tridecanal, 2-ethyl, 1-dodecanal, 3-propyl-1-undecanal, pentadecanal, 2-methyl-1-tetradecanal, hexadecanal, 2-methyl-1-pentadecanal, heptadecanal, 2-methyl-1-hexadecanal, octadecanal, 2-methyl-1-heptadecanal, nonodecanal, 2-methyl-1-octadecanal, 2-ethyl 1-heptadecanal, 3-propyl-1-hexadecanal, and the like.

Some embodiments of the invention will now be described in more detail in the following Examples.

EXAMPLES

All parts and percentages in the following examples are by weight unless otherwise indicated. Pressures are given as gauge pressure unless otherwise indicated. Rhodium concentration is determined by atomic absorption ("AA") using an air/acetylene flame. It has been found that this technique will not reliably quantify clustered rhodium; thus, this method may be used to indicate "rhodium loss" (e.g., undetectable rhodium is clustered or otherwise no longer in solution). Color change (starting from a colorless or light yellow solution), such as darkening or formation of black film or solids is also indicative of rhodium catalyst degradation.

Ligand A is a commercially available organomonophosphite, tris(2,4-di-tert-butylphenyl) phosphite:

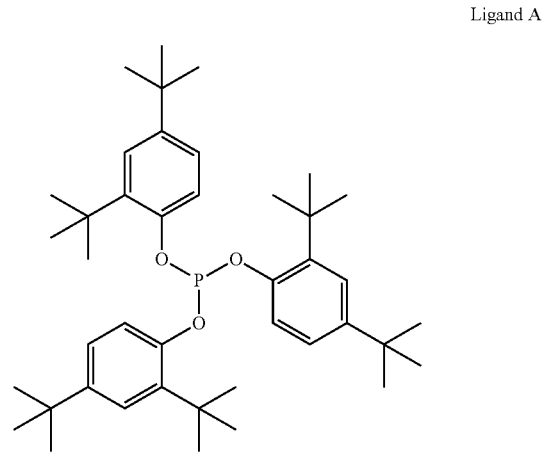 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

Ligand A

Catalyst A is a hydroformylation catalyst solution of the following composition:

| Component | Concentration (wt %) |
|---|---|
| Isononyl Aldehydes | 39.5 |
| Isononyl Aldehyde Heavies | 50 |
| C8 Olefin | 10 |
| Ligand A | 0.5 |
| Rhodium | 0.04 |

General Procedure for Hydroformylation Process

The catalyst-containing solution referenced in the Inventive Examples below is prepared in a $N_2$-padded purge box and transferred via vacuum into a 100 mL Parr mini-reactor. The catalyst-containing solution is then preheated with agitation (500 rpm) at the desired reactor temperature for 30 minutes in the presence of C8 olefin and 1:1 syngas (equal parts carbon monoxide:hydrogen). A pressure of approximately 50 psig 1:1 gas is established during this time with a Brooks model 5866 flow meter and after the 30 minute catalyst activation period, the reactor pressure is increased to the desired reactor pressure. The pressure is held constant for the desired run time and total gas uptake is measured with a Brooks 0151E totalizer.

General Procedure for Oxidative Rhodium Extraction Experiments

Catalyst A is weighed into a 60 mL glass bottle, a stir bar is added, and an aqueous extraction solution is added, followed by any additives. The resulting biphasic solution is stirred at the desired temperature in an oil bath and continuously sparged with plant air at atmospheric pressure. After the reaction is complete, the catalyst solution bottle is removed from the oil bath, the phases are allowed to separate for 5 minutes, and samples (typically, 0.2 g) are removed from each phase and analyzed by AA.

Comparative Example 1

Catalyst A (20 g) is sparged with air for 4 hours at 70° C. while being magnetically stirred. After the oxidation treatment with air, the catalyst solution is treated with deionized water (20 g) and the biphasic solution stirred at room temperature for 1 hour. The phases are separated and sampled for AA analysis.

Comparative Example 2

Catalyst A (20 g) is treated with deionized water (20 g) and sparged with air for 4 hours at 70° C. while being magnetically stirred. After the oxidation treatment with air, the phases are separated and sampled for AA analysis.

Comparative Example 3

To the biphasic catalyst solution from Comparative Example 2 is added 4.0 g glacial acetic acid and the biphasic solution is stirred at room temperature for 2 hours. The phases are separated and sampled for AA analysis.

Inventive Example 1

The biphasic acetic acid-containing catalyst solution from Comparative Example 3 is sparged with air for 4 hours at 70° C. while being magnetically stirred. During this time, the aqueous phase develops a clear, gold color. After the oxidation treatment, the phases are separated and sampled for AA analysis.

Comparative Example 4

The biphasic catalyst solution from Inventive Example 1 is heated and magnetically stirred overnight at 70° C. in the absence of an air sparge. The phases are separated and sampled for AA analysis.

The results from Comparative Examples 1~4 and Inventive Example 1 are summarized in Table 1. As used herein, especially in Tables, Comparative Example may be abbreviated to "C.E." and Inventive Example may be abbreviated to "I.E."

TABLE 1

| Example | Reaction Conditions | Temp. (° C.) | Time (hours) | Organic Phase Rh conc. (ppmw) | Aqueous Phase Rh conc. (ppmw) |
|---|---|---|---|---|---|
| C.E. 1 | Air sparge, followed by water extraction | 70 | 4 | 423 | 8 |
| C.E. 2 | Air sparge in the presence of water | 70 | 4 | 388 | 29 |
| C.E. 3 | Air sparge in the presence of water, followed by acetic acid extraction | 25 | 2 | 361 | 6 |
| I.E. 1 | Air sparge, 20% aqueous acetic acid | 70 | 4 | 143 | 232 |
| C.E. 4 | Continued heating in absence of air sparge | 70 | 16 | 62 | 56 |

Comparative Examples 1-4 and Inventive Example 1 show that only when air (an oxidant), water, and acetic acid (a C2 acid) are all present will successful transfer of the precious metal from the organic phase into the aqueous phase occur. Comparative Example 4 shows however that continued heating in the absence of an oxidant will result in loss of rhodium from both phases.

Inventive Example 2

Catalyst A (20 g) is treated with 20% aqueous acetic acid (20 g) and sparged with air for 12 hours at 65° C. while being magnetically stirred. After the oxidation treatment, the phases are separated and sampled for AA analysis.

Inventive Example 3

Catalyst A (5 g) is treated with 20% aqueous acetic acid (20 g) and sparged with air for 4 hours at 65° C. while being magnetically stirred. After the oxidation treatment, the phases are separated and sampled for AA analysis.

Inventive Example 4a

Catalyst A (20 g) is treated with 20% aqueous acetic acid (20 g) and sparged with air for 4 hours at 65° C. while being magnetically stirred. After the oxidation treatment, the phases are separated and sampled for AA analysis.

Inventive Example 4b

The aqueous phase is removed from the biphasic solution resulting from Inventive Example 4a. The organic phase is recycled and treated with 20% aqueous acetic acid (20 g). The biphasic solution is sparged with air for 4 hours at 65° C. while being magnetically stirred. After the oxidation treatment, the phases are separated and sampled for AA analysis.

The results from Inventive Examples 2-4 are summarized in Table 2.

TABLE 2

| Example | Reaction Conditions | Temp. (° C.) | Time (hours) | Organic Phase Rh conc. (ppmw) | Aqueous Phase Rh conc. (ppmw) |
|---|---|---|---|---|---|
| I.E. 2 | Air sparge, 20% aqueous acetic acid | 65 | 12 | 150 | 277 |
| I.E. 3 | Air sparge, 20% aqueous acetic acid (1:4 w/w catalyst: aqueous) | 65 | 4 | 140 | 49 |
| I.E. 4a | Air sparge, 20% aqueous acetic acid | 65 | 4 | 102 | 287 |
| I.E. 4b | Recycle of catalyst from I. E. 4a, second air sparge, 20% aqueous acetic acid | 65 | 4 | 38.2 | 63.5 |

Comparative Example 4 (from Table 1) and Inventive Example 2 show that the oxidation treatment should only be as long as needed to remove the rhodium from the organic phase, and that the continued presence of the oxidant until the next step in the process can help avoid loss of precious metal to insoluble metal. Inventive Examples 2-4 show that prolonged treatment has minimal effect. Inventive Example 4b shows that a second extraction is the preferred means to obtain maximum precious metal recovery (rather than a prolonged single treatment).

Inventive Example 5a

Catalyst A (10 g) is treated with 50% aqueous acetic acid (10 g) and sparged with air for 4 hours at 65° C. while being magnetically stirred. After the oxidation treatment, the phases are separated and sampled for AA analysis.

Inventive Example 5b

The biphasic catalyst solution resulting from Inventive Example 5a is sparged with air for an additional 4 hours at 65° C. while being magnetically stirred. After the oxidation treatment, the phases are separated and sampled for AA analysis.

Inventive Example 5c

The aqueous phase is removed from the biphasic solution resulting from Inventive Example 5b. The organic phase is recycled and treated with 33% aqueous acetic acid (3.8 g). The biphasic solution is sparged with air for 4 hours at 65° C. while being magnetically stirred. After the oxidation treatment, the phases are separated and sampled for AA analysis.

Inventive Example 6

Catalyst A (10 g) is treated with 70% aqueous acetic acid (10 g) and sparged with air for 4 hours at 65° C. while being magnetically stirred. After the oxidation treatment, the phases are separated and sampled for AA analysis.

The results from Inventive Examples 5-6 are summarized in Table 3. Similar results as obtained in the prior Examples were found in Inventive Examples 5-6 using more concentrated acid. A comparison of Inventive Examples 4a and 5a shows that a higher acid content leads to improved extraction of precious metal into the aqueous phase.

TABLE 3

| Example | Reaction Conditions | Temp. (° C.) | Time (hours) | Organic Phase Rh conc. (ppmw) | Aqueous Phase Rh conc. (ppmw) |
|---|---|---|---|---|---|
| I.E. 5a | Air sparge, 50% aqueous acetic acid | 65 | 4 | 46.2 | 350 |
| I.E. 5b | Biphasic solution from Ex. 5a is treated with air for 4 additional hours | 65 | 4 | 28.3 | 423 |
| I.E. 5c | Recycle of catalyst from I.E. 5b, second air sparge, 33% aqueous acetic acid | 65 | 4 | 11.3 | 104 |
| I.E. 6 | Air sparge, 70% aqueous acetic acid | 65 | 4 | 38.1 | 581 |

It should be noted that the sparging process tends to remove organics and/or water on this scale of equipment. Thus, the total metal mass balance may appear to exceed 100% but the relative distribution of metal between the phases is clearly evident.

Comparative Example 5

Catalyst A (20 g) is treated with 20% aqueous nonanoic acid (20 g) and sparged with air for 4 hours at 65° C. while being magnetically stirred. After the oxidation treatment, the phases are separated and sampled for AA analysis.

Comparative Example 6

Catalyst A (20 g) is treated with 1 molar aqueous ammonium acetate (20 g) and sparged with air for 4 hours at 65° C. while being magnetically stirred. After the oxidation treatment, the phases are separated and sampled for AA analysis.

Inventive Example 7

Catalyst A (20 g) is treated with 50% aqueous citric acid (20 g) and sparged with air for 4 hours at 65° C. while being magnetically stirred. After the oxidation treatment, the phases are separated and sampled for AA analysis.

Inventive Example 8

Catalyst A (20 g) is treated with 50% aqueous phosphorous acid (20 g) and sparged with air for 4 hours at 65° C. while being magnetically stirred. After the oxidation treatment, the phases are separated and sampled for AA analysis.

Inventive Example 9

Catalyst A (20 g) is treated with 50% aqueous glutaric acid (20 g) and sparged with air for 4 hours at 65° C. while being magnetically stirred. After the oxidation treatment, the phases are separated and sampled for AA analysis.

Inventive Example 10

A catalyst solution prepared from $Rh(CO)_2acac$ (0.010 g), Ligand A (0.10 g), and isononyl aldehydes (10 g) is treated with 50% aqueous propionic acid (10 g) and sparged with air for 4 hours at 65° C. while being magnetically stirred. After the oxidation treatment, the phases are separated and sampled for AA analysis.

The results from Comparative Examples 5-6 and Inventive Examples 7-10 are summarized in Table 4. As shown in Table 4, a variety of components were tested. It is clear that it is not just the carboxylate moiety that is key to the recovery but also the acid form (e.g., acetate is not effective). Higher acids such as nonanoic acid are ineffective.

TABLE 4

| Example | Reaction Conditions | Temp. (° C.) | Time (hours) | Organic Phase Rh conc. (ppmw) | Aqueous Phase Rh conc. (ppmw) |
|---|---|---|---|---|---|
| C.E. 5 | Air sparge, 20% aqeuous nonanoic acid | 65 | 4 | 329 | 3 |
| C.E. 6 | Air sparge, 1 M ammonium acetate | 65 | 4 | 356 | 9 |
| I.E. 7 | Air sparge, 50% aqueous citric acid | 65 | 4 | 278 | 103 |
| I.E. 8 | Air sparge, 50% phosphorous acid | 65 | 4 | 98 | 227 |
| I.E. 9 | Air sparge, 50% glutaric acid | 65 | 4 | 89 | 313 |
| I.E. 10 | Air sparge, 50% propionic acid | 65 | 4 | 138 | 329 |

Inventive Example 11

Catalyst A (10 g) is treated with 50% aqueous acetic acid (10 g) and sparged with air for 24 hours at ambient temperature while being magnetically stirred. After the oxidation treatment, the phases are separated and sampled for AA analysis.

Inventive Example 12a

Catalyst A (10 g) is treated with 50% aqueous acetic acid (10 g) and 30% aqueous hydrogen peroxide (0.10 g) for 24 hours at ambient temperature while being magnetically stirred. After the oxidation treatment with hydrogen peroxide, the phases are separated and sampled for AA analysis.

Inventive Example 12b

The biphasic solution resulting from Inventive Example 12a is treated with additional 30% aqueous hydrogen peroxide (0.30 g) for 96 hours at ambient temperature while being magnetically stirred. After the oxidation treatment with hydrogen peroxide, the phases are separated and sampled for AA analysis.

The results from Inventive Examples 11 and 12 are summarized in Table 5. The use of hydrogen peroxide as an oxidant at relatively low temperature gave moderate results but superior to comparable air oxidation over the same period of time.

TABLE 5

| Example | Reaction Conditions | Temp. (° C.) | Time (hours) | Organic Phase Rh conc. (ppmw) | Aqueous Phase Rh conc. (ppmw) |
|---|---|---|---|---|---|
| I.E. 11 | Air sparge, 50% aqeuous acetic acid | 25 | 24 | 324 | 32 |
| I.E. 12a | Hydrogen peroxide, 50% aqueous acetic acid | 25 | 24 | 225 | 129 |
| I.E. 12b | Additional hydrogen peroxide, 50% aqueous acetic acid | 25 | 96 | 181 | 171 |

The following examples consider extraction of the rhodium from the aqueous phase into an organic recovery solvent.

Inventive Example 13

Into a 60 mL glass bottle is weighed 10.0 g of a rhodium aqueous acetic acid solution (initial Rh conc.=163 ppmw, approximately 40% acetic acid), followed by 10.0 g mixed C9 aldehydes (which also comprises 5.2% n-octane, unreacted olefins, and other minor components) containing 1.0 wt % Ligand A. The resulting biphasic solution is stirred under $N_2$ until the ligand dissolves and the solution is charged to a Parr reactor and heated to 100° C. under 55 psig 1:1 syngas for 3 hours with stirring (700 rpm). After 1 hour and 3 hours, the catalyst solution is collected and both phases are sampled for Rh AA analysis.

The results from Inventive Example 13 are summarized in Table 6.

TABLE 6

| Example | Headspace Composition (Pressure) | Temp. (° C.) | Time (hours) | Organic Phase Rh conc. (ppmw) | Aqueous Phase Rh conc. (ppmw) |
|---|---|---|---|---|---|
| I.E. 13 | 1:1 syngas (50 psig) | 100 | 1 | 145 | 13 |
|  |  |  | 3 | 146 | 5 |

Inventive Example 14

Into a 60 mL glass bottle is weighed 10.0 g of a rhodium aqueous acetic acid solution (initial Rh conc.=183 ppmw, approximately 40% acetic acid), followed by 10.0 g mixed butene-dimers containing 1.0 wt % Ligand A. The resulting biphasic solution is sparged with nitrogen for 5 minutes, followed by 1:1 syngas for 2 minutes at ambient temperature and pressure. Next, the solution bottle is capped and sealed with Parafilm and heated to 70° C. for 4 hours, with samples being withdrawn from both phases after 1, 2, and 4 hours after allowing the layers to phase separate. Thereafter, the biphasic catalyst solution is again sparged with 1:1 syngas (2 minutes) and heated to 70° C. for 1 hour at ambient pressure; samples are collected for Rh AA analysis. Finally, the catalyst solution is heated to 70° C. at 55 psig 1:1 syngas for 1 hour in a Parr reactor with stirring (700 rpm). Samples are collected for Rh AA analysis.

The results from Inventive Example 14 are summarized in Table 7 (n.m.=not measured).

TABLE 7

| Example | Headspace Composition (Pressure) | Temp. (° C.) | Time (minutes) | Organic Phase Rh conc. (ppmw) | Aqueous Phase Rh conc. (ppmw) |
|---|---|---|---|---|---|
| I.E. 14 | 1:1 syngas sparge (ambient) | 25 | 2 | 28 | 135 |
| | 1:1 syngas (ambient) | 70 | 240 | 134 | 71 |
| | 1:1 syngas sparge (ambient) | 25 | 2 | n.m. | n.m. |
| | 1:1 syngas (ambient) | 70 | 120 | 144 | 69 |
| | 1:1 syngas (55 psig) | 70 | 60 | 194 | 11 |

This example shows the conditions for rhodium recovery from the aqueous phase. While treatment with syngas at atmospheric pressure is effective with non-polar olefin and Ligand A, higher pressures give better results. In the absence of Ligand A, when higher pressures are used, severe rhodium loss is observed (rhodium black is observed). Butene-dimers or butane-dimers are used to model the less reactive internal olefins generated with 1-octene hydroformylation. Under the conditions used in the recovery step (i.e, temperature and pressure), very little of these highly branched olefins are converted to aldehyde.

If mixed C9-aldehydes are used as the solvent instead of the butene dimer, the phase separation is much slower, thus teaching that non-polar olefins are preferable solvents to pure aldehydes.

Inventive Example 15

Into a 60 mL glass bottle is weighed 10.0 g of a rhodium aqueous acetic acid solution (initial Rh conc.=183 ppmw, approximately 40% acetic acid), followed by 10.0 g mixed butene-dimers containing 1.0 wt % Ligand A. The resulting biphasic solution is stirred under $N_2$ until the ligand dissolves and the solution is charged to a Parr reactor and heated to 70° C. under 55 psig 1:1 syngas for 2 hours with stirring (700 rpm). After 1 hour and 2 hours, the catalyst solution is collected and both phases are sampled for Rh AA analysis.

The results are shown in Table 8. Inventive Example 15 shows excellent transfer from the aqueous phase to the organic phase under these conditions.

TABLE 8

| Example | Headspace Composition (Pressure) | Temp. (° C.) | Time (hours) | Organic Phase Rh conc. (ppmw) | Aqueous Phase Rh conc. (ppmw) |
|---|---|---|---|---|---|
| I.E. 15 | 1:1 syngas (50 psig) | 70 | 1 | 200 | 14 |
| | | | 2 | 209 | 2 |

Inventive Example 16

Catalyst A (20 g) is treated with 20% aqueous acetic acid (20 g) and the resulting biphasic solution is sparged continuously with air for 4 hr at 65° C. with stirring. The phases are separated and the aqueous acetic acid extract is collected and sparged with nitrogen for 30 minutes at ambient temperature. A solution of 1 wt % Ligand A dissolved in isononyl aldehydes (28 g) (which also comprises 5.2% n-octane, unreacted olefins, and other minor components) is added and the biphasic mixture is charged to a Parr reactor and heated to 100° C. under 300 psig 1:1 syngas for 1 hour with stirring (700 rpm). After the treatment, the reactor is cooled to ambient temperature for 1 hour and the catalyst solution is collected and both phases are sampled for Rh AA analysis.

The results of Inventive Example 16 are shown in Table 9. Inventive Example 16 shows excellent transfer from the aqueous phase to the organic recovery phase under these conditions.

TABLE 9

| Example | Headspace Composition (Pressure) | Temp. (° C.) | Time (hours) | Organic Phase Rh conc. (ppmw) | Aqueous Phase Rh conc. (ppmw) |
|---|---|---|---|---|---|
| I.E. 16 | 1:1 syngas (300 psig) | 100 | 1 | 123 | 27 |

Inventive Example 17

Into a 100 mL glass bottle is added Catalyst A (20 g) followed by 20% aqueous acetic acid (20 g). The resulting biphasic solution is sparged with air at 65° C. for 4 hr with stirring and cooled to room temperature. The phases separate and both layers are sampled for Rh AA analysis. Next, the aqueous layer is collected and sparged with $N_2$ for approximately 1 hr at ambient temperature. A solution of 1 wt % Ligand A dissolved in isononyl aldehydes (20 g) (which also comprises 5.2% n-octane, unreacted olefins, and other minor components) is added to the aqueous solution and the resulting biphasic mixture is charged to a Parr reactor and heated/stirred at 100° C. under 300 psig 1:1 $H_2$:CO for 2 hr. The reactor is cooled to ambient temperature and the mixture is collected; both phases are sampled for Rh AA analysis. The results of the oxidation treatment and the syn-gas recovery step are summarized in Table 10.

TABLE 10

| Example | Reaction Conditions (Pressure) | Temp. (° C.) | Time (hours) | Organic Phase Rh conc. (ppmw) | Aqueous Phase Rh conc. (ppmw) |
|---|---|---|---|---|---|
| I.E. 17 | Air sparge (atmospheric) | 65 | 4 | 82 | 321 |
| | Syngas treatment (300 psig) | 100 | 2 | 238 | 10 |

Inventive Example 18

Next, the aqueous solution from Inventive Example 17 is removed from the biphasic catalyst solution and the organic catalyst solution is again charged to the Parr reactor along with 5.0 mL mixed butene dimers and subjected to a hydroformylation test at 85° C. and 250 psig syn gas for 7 hours. As summarized in Table 11, the recovered hydroformylation catalyst exhibited approximately 80% of the activity of the Catalyst A when it was submitted to a hydroformylation test, consistent with recovery of approximately 80% of the dissolved rhodium.

TABLE 11

| Example | Catalyst Solution | Temp. (° C.) | Time (hours) | Total Syn Gas uptake (% of Catalyst A activity) |
|---|---|---|---|---|
| I.E. 18 | Catalyst A | 85 | 7 | 100 |
| | Recovered catalyst from I.E. 17 | 85 | 7 | 77 |

What is claimed is:

1. A process for the recovery of rhodium from a catalyst purge stream from a C6 or higher olefin hydroformylation process, the process comprising:
 (a) treating a catalyst-containing liquid purge stream from the hydroformylation process, wherein the catalyst comprises rhodium and an organophosphorous ligand, with an oxidant in the presence of a separate liquid aqueous phase comprising a halide-free acid at a sufficient temperature to effect oxidation of 50 weight % or more of the contained organophosphorous ligand, wherein the halide-free acid is a C1-C6 organic acid or phosphorous acid;
 (b) recovering the aqueous phase;
 (c) contacting the aqueous phase with a separate organic phase by mixing the two phases under a syngas atmosphere, wherein the separate organic phase comprises water-insoluble, hydrolysable organophosphorous ligand and recycled olefin from a hydroformylation process; and
 (d) separating the organic phase to be recycled back to a hydroformylation process.

2. The process of claim 1, further comprising, following recovery of the aqueous phase in step (b), treating the remaining organic phase from step (a) with water or with an aqueous solution comprising halide-free C1-C6 organic acid or phosphorous acid or with an oxidant in the presence of a separate liquid aqueous phase comprising halide-free C1-C6 organic acid or phosphorous acid, recovering a second aqueous phase, and combining the second aqueous phase with the aqueous phase in step (b) prior to step (c).

3. The process of claim 1, further comprising washing the organic phase from step (d) with an aqueous wash prior to sending the organic phase to the hydroformylation process.

4. The process of claim 3, wherein the aqueous wash comprises a water soluble amine.

5. The process of claim 1, wherein the halide-free organic acid in step (a) is a halide-free C1-C2 organic acid.

6. The process of claim 1, wherein the recycled olefin is from a different hydroformylation process than the catalyst-containing liquid purge stream.

7. The process of claim 1, wherein the organophosphorous ligand is a tertiary organophosphorous ligand.

8. The process of claim 1, further comprising, following recovery of the aqueous phase in step (b), sparging the aqueous phase with an inert gas or syngas prior to introduction of the water-insoluble, hydrolysable organophosphorous ligand in step (c).

9. The process of claim 1, wherein the oxidant is oxygen, air, oxygen diluted in an inert gas, hydrogen peroxide, an alkyl peroxide, an aryl peroxide, a dialkylperoxide, a diarylperoxide, or a peroxyacid having less than nine carbon atoms.

10. The process of claim 1, wherein the recycled olefin is C6 or higher and has a lower hydroformylation activity than an olefin feed used in the hydroformylation process that generated the catalyst-containing liquid purge stream.

11. The process of claim 1, wherein the recycled olefin is C6 or higher and has a higher average degree of branching than an olefin feed used in the hydroformylation process that generated the catalyst-containing liquid purge stream.

12. The process of claim 1, wherein the contacting of the aqueous phase with the separate organic phase in step (c) is conducted at a temperature between 0° C. and 150° C.

13. The process of claim 1, wherein the contacting of the aqueous phase with the separate organic phase in step (c) is conducted at a syngas pressure of at least 1 bar.

* * * * *